(12) United States Patent
Morales

(10) Patent No.: US 11,170,066 B2
(45) Date of Patent: Nov. 9, 2021

(54) SYSTEMS AND METHODS FOR PERSONALIZATION OF DIGITAL DISPLAYED MEDIA

(71) Applicant: Hyver Labs, LLC, Scottsdale, AZ (US)

(72) Inventor: Kirk Morales, Scottsdale, AZ (US)

(73) Assignee: Hyver Labs, LLC, Phoenix, AZ (US)

(*) Notice: Subject to any disclaimer, the term of this patent is extended or adjusted under 35 U.S.C. 154(b) by 0 days.

(21) Appl. No.: 16/411,996

(22) Filed: May 14, 2019

(65) Prior Publication Data

US 2019/0347301 A1 Nov. 14, 2019

Related U.S. Application Data

(60) Provisional application No. 62/671,232, filed on May 14, 2018.

(51) Int. Cl.
*G06F 40/14* (2020.01)
*G06F 16/957* (2019.01)
*G06F 16/958* (2019.01)
*H04L 29/08* (2006.01)
*G06F 16/954* (2019.01)

(52) U.S. Cl.
CPC ........ *G06F 16/9577* (2019.01); *G06F 16/954* (2019.01); *G06F 16/958* (2019.01); *H04L 67/22* (2013.01)

(58) Field of Classification Search
CPC .... G06F 40/14; G06F 40/143; G06F 16/9577; G06F 16/958; G06F 16/954; G06F 16/9574; H04L 67/22; H04L 67/02; H04L 67/36
See application file for complete search history.

(56) References Cited

U.S. PATENT DOCUMENTS

| | | | |
|---|---|---|---|
| 2014/0075276 A1* | 3/2014 | Pretti | G06F 16/9535 715/205 |
| 2014/0143655 A1* | 5/2014 | Alon | G06F 40/14 715/234 |
| 2014/0372871 A1* | 12/2014 | Song | G06F 40/106 715/234 |
| 2016/0259840 A1* | 9/2016 | Zheng | G06F 40/14 |
| 2018/0121560 A1* | 5/2018 | Chen | G06F 16/9577 |

* cited by examiner

*Primary Examiner* — Keith D Bloomquist
(74) *Attorney, Agent, or Firm* — Michelle L. Gross, P.C.

(57) ABSTRACT

In some embodiments, a method can comprise using compiled personalization logic to evaluate one or more user conditions of a user to determine one or more user segments and evaluate an experience based at least in part on the one or more user segments. In many embodiments, the method also can comprise executing the compiled personalization logic when the user visits the channel in order to facilitate display of personalized content based at least in part on the experience. Other embodiments of related methods and systems are also provided.

16 Claims, 7 Drawing Sheets

700

702 - Using compiled personalization logic for real time personalization of a channel to:

704 - Evaluate one or more user conditions of a user to determine one or more user segments; and 706 - Evaluate an experience based at least in part on the one or more user segments.

708 - Executing the compiled personalization logic when the user visits the channel in order to facilitate display of personalized content based at least in part on the experience.

300

302 - Inserting a tracking code in a webpage of a website, wherein the tracking code tracks user activity on the webpage of the website.

304 - Preventing at least a portion of standard content from displaying on the webpage of the website 306 - Receiving a request related to the webpage of the website from the tracking code.

308 - Determining a user identity of the user.

310 – Determining one or more user conditions of the user based at least in part on the user activity.

312 - Determining one or more segments based at least in part on the one or more user conditions of the user and the user identity of the user.

314 - Determining an experience based at least in part on the one or more segments of the user and the user identity of the user.

316 - Facilitating display of personalized content on the webpage of the website in place of the at least the portion of the standard content based at least in part on the experience.

FIG. 3

SYSTEMS AND METHODS FOR PERSONALIZATION OF DIGITAL DISPLAYED MEDIA

CROSS-REFERENCE TO RELATED APPLICATIONS

This application claims priority to U.S. Provisional Application No. 62/671,232, entitled "Methods and Systems for Personalization of Digital Displayed Media," filed May 14, 2018, which is incorporated by referenced herein in its entirety.

TECHNICAL FIELD

This disclosure relates to systems, methods, devices, and other approaches to providing a personalized user experience for websites and various other online and/or connected media. In particular, various embodiments may providing a tailored user experience to a user, even when visiting the same website or media source.

BACKGROUND

One issue that many brands, companies, website owners, and other parties face with respect to their websites is low engagement and conversion of a user, particularly for websites including goods or services for purchase by the user. In addition, these parties may also face issues with disconnected or disparate user experiences over the duration of a user's interaction with the brand, company, or website. When a customer or user visits a website or other connected media, the user experience can be inconsistent, causing low engagement and conversions. Many times, the website displays a generic landing page, without any customization, personalization, or tailoring for the user. Often, when a user clicks on an advertisement or ad on one website, the user is taken to a third party website to learn more about the advertised product or service. The third party website shows the same page to each user, without customization for that user. Accordingly, there is a need for systems and methods to provide for personalization of digital displayed media.

BRIEF DESCRIPTION OF THE DRAWINGS

To facilitate further description of the embodiments, the following drawings are provided in which:

FIG. 3 illustrates a flowchart for a method for personalizing digital displayed media, in accordance with an embodiment;

Figure 1:
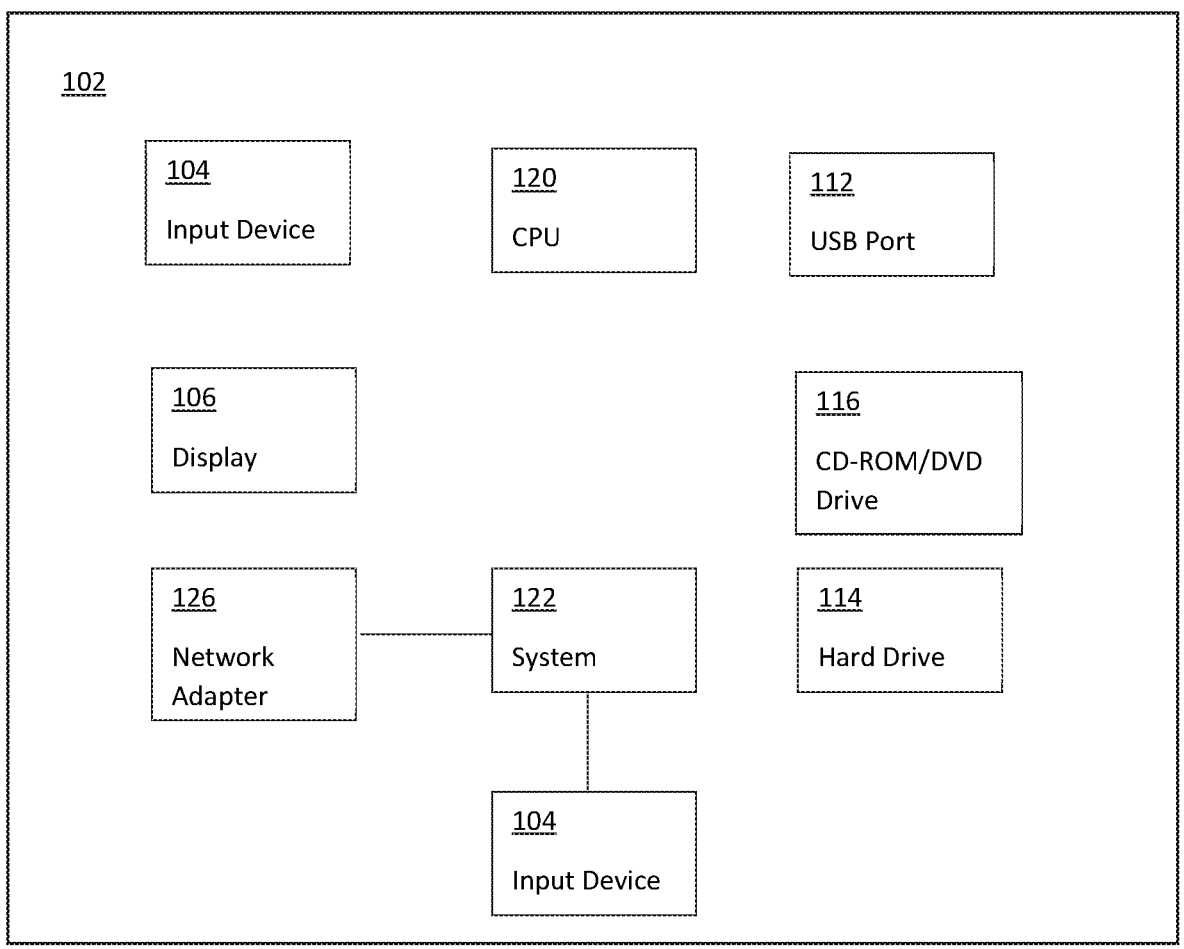
FIG. 1 illustrates a block diagram that illustrates a embodiment of a computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In many embodiments, the system can comprise one or more processing modules and one or more non-transitory storage modules storing computing instructions configured to run on the one or more processing modules and perform acts. In many embodiments, the acts can comprise inserting a tracking code in a webpage of a website, wherein the tracking code tracks user activity on the webpage of the website. In some embodiments, the acts also can comprise preventing at least a portion of standard content from displaying on the webpage of the website and receiving a request related to the webpage of the website from the tracking code. The acts further can comprise determining a user identity of the user and determining one or more user conditions of the user based at least in part on the user activity. In a number of embodiments, the acts can comprise determining one or more segments based at least in part on the one or more user conditions of the user and the user identity of the user and determining an experience based at least in part on the one or more segments of the user and the user identity of the user. In many embodiments, the acts further can comprise facilitating display of personalized content on the webpage of the website in place of the at least the portion of the standard content based at least in part on the one or more segments.

In some embodiments, a method can comprise inserting a tracking code in a webpage of a website, wherein the tracking code tracks user activity on the webpage of the website. In some embodiments, the method also can comprise preventing at least a portion of standard content from displaying on the webpage of the website and receiving a request related to the webpage of the website from the tracking code. The method further can comprise determining a user identity of the user and determining one or more user conditions of the user based at least in part on the user activity. In a number of embodiments, the method can comprise determining one or more segments based at least in part on the one or more user conditions of the user and the user identity of the user and determining an experience based at least in part on the one or more segments of the user and the user identity of the user. In many embodiments, the method further can comprise facilitating display of personalized content on the webpage of the website in place of the at least the portion of the standard content based at least in part on the one or more segments.

Various embodiments can include a method. In many embodiments, the method can comprise using complied personalization logic for real time personalization of a channel. In some embodiments the compiled personalization logic can be used to evaluate one or more user conditions of a user to determine one or more user segments and to evaluate an experience based at least in part on the one or more user segments. In a number of embodiments, the method can comprise executing the compiled personalization logic when the user visits the channel in order to facilitate display of personalized content based at least in part on the experience.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 such as an input device 104 (e.g., a keyboard, a touchpad, and/or a mouse) and/or display 106 (e.g., a computer monitor or touch screen) also can be appropriate for implementing part or all of one or more embodiments of the techniques, methods, and/or systems described herein.

Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A central processing unit (CPU) 120 is coupled to a system bus 122. In various embodiments, the architecture of CPU 120 can be compliant with any of a variety of commercially distributed architecture families.

Continuing with FIG. 1, system bus 122 also is coupled to a memory storage unit 124, where memory storage unit 124 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc.

Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 124, an external memory storage drive (not shown), such as, for example, a USB-equipped electronic memory storage drive coupled to universal serial bus (USB) port 112, hard drive 114 (a CD-ROM and/or DVD for use with a CD-ROM and/or DVD drive 116, floppy disk for use with a floppy disk drive (not shown), an optical disc (not shown), a magneto-optical disc (now shown), magnetic tape (not shown), etc.). Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise (but are not limited to) one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, (vi) the Symbian™ operating system by Accenture PLC of Dublin, Ireland; (vii) tvOS operating system by Apple Inc. or (viii) any other operating system.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 120.

Various I/O devices such as a disk controller, a graphics adapter, a video controller, a keyboard adapter, a mouse adapter, a network adapter 126, and other I/O devices can be coupled to system bus 122. A video controller is suitable for display 106 to display images on a screen of computer system 100 (FIG. 1). A disk controller can control hard drive 114, USB port 112, and CD-ROM drive 116. In other embodiments, distinct units can be used to control each of these devices separately.

Network adapter 126 can be suitable to connect computer system 100 to a computer network by wired communication (e.g., a wired network adapter) and/or wireless communication (e.g., a wireless network adapter). In some embodiments, network adapter 126 can be plugged or coupled to an expansion port (not shown) in computer system 100. In other embodiments, network adapter 126 can be built into computer system 100. For example, network adapter 126 can be built into computer system 100 by being integrated into the motherboard chipset (not shown), or implemented via one or more dedicated communication chips (not shown), connected through a PCI (peripheral component interconnector) or a PCI express bus of computer system 100 or USB port 112.

Although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 120. At least a portion of the program instructions, stored on these devices, can be suitable for carrying out at least part of the techniques and methods described herein.

Further, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 2:
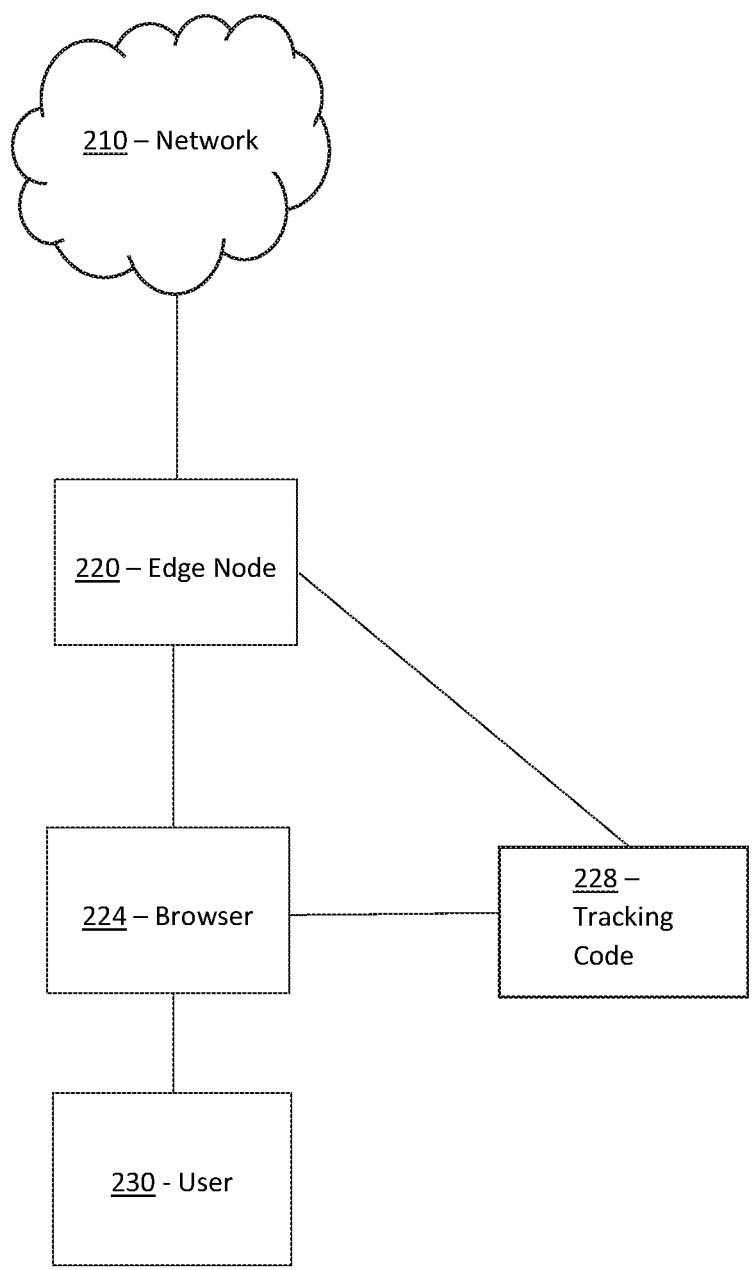
FIG. 2 illustrates a block diagram for a system for personalization of digital displayed media, according to an embodiment.

Turning to FIG. 2, FIG. 2 illustrates a representative block diagram of a system 200, according to an embodiment. System 200 is merely exemplary and embodiments of the system are not limited to the embodiments presented herein. System 200 can be employed in many different embodiments or examples not specifically depicted or described herein. In some embodiments, certain elements or modules of system 200 can perform various methods and/or activities of those methods. In these or other embodiments, the methods and/or the activities of the methods can be performed by other suitable elements or modules of system 200. In many embodiments, system 200 can be a web-based personalization platform that can dynamically change content of a given webpage, website, or other media source, to show a personalized experience to each user.

Generally, therefore, system 200 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 200 described herein.

In a number of embodiments, system 200 can comprise a network 210, such as a web worker, a cloud worker, or a content delivery network (e.g., CLOUDFLARE or similar), an edge node 220, and one or more browsers 224, which each can be a computer system 100 (FIG. 1), as described above, and can each be a single computer, a single server, or a cluster or collection of computers or servers As discussed in more detail below, tracking code 228 can be can be embedded or placed in a browser 224. In some embodiments, tracking code 228 can be inserted into webpage of a given website. In many embodiments, tracking code 228 can be inserted in a header of the webpage. In some embodiments, tracking code 228 can be inserted in a body of the webpage. When a user 230 interacts with the webpage of the website (such as by viewing, clicking, or taking some other action or user condition) tracking code 228 can allow for personalization of the webpage (e.g., changing or modifying content or other displayed information), as well as perform user identity management and account management, as described below. In various embodiments, tracking code 228 can allow for personalization of the webpage based on implied characteristics, such as geolocation or other information about the user's browser, or by explicit characteristics provided by a third party system.

In many embodiments, system 200 can comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of system 200 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In a similar manner, the processing module(s) and the memory storage module(s) can be local and/or remote to each other.

Communication network 210, edge node 220, one or more browsers 224 and/or one or more databases (not shown) can be implemented using any suitable manner of wired and/or wireless communication. Accordingly, system 200 can comprise any software and/or hardware components configured to implement the wired and/or wireless communication.

Turning ahead in the drawings, FIG. 3 illustrates a flow chart for a method 300, according to an embodiment. Method 300 is merely exemplary and is not limited to the embodiments presented herein. In some embodiments, method 300 can be similar to method 700 (as discussed below). Method 300 can be employed in many different embodiments or examples not specifically depicted or described herein. In some embodiments, the activities of method 300 can be performed in the order presented. In other embodiments, the activities of method 300 can be performed in any suitable order. In still other embodiments, one or more of the activities of method 300 can be combined or skipped. In many embodiments, system 200 (FIG. 2) can be suitable to perform method 300 and/or one or more of the activities of method 300. In these or other embodiments, one or more of the activities of method 300 can be implemented as one or more computer instructions configured to run at one or more processing modules and configured to be stored at one or more non-transitory memory storage modules. Such non-transitory memory storage modules can be part of a computer system such as system 200 (FIG. 2), including edge node 220 or network 210 (FIG. 2). The processing module(s) can be similar or identical to the processing module(s) described above with respect to computer system 100 (FIG. 1).

In many embodiments, method 300 can comprise an activity 302 of compiling inserting a tracking code in a webpage of a website, wherein the tracking code tracks user activity on the webpage of the website. Method 300 further can comprise relating account specific logic to the tracking code (e.g., tracking code 228 (FIG. 2)). The tracking code can be inserted in a browser (e.g., browser 224 (FIG. 2)), such as a header or body of a webpage of a website. The account specific logic can be based in part on evaluating the user conditions and the user experience. The tracking code can be updated with the result of evaluating the user and the user experience. The tracking code can allow the webpage to communicate with an application programming interface (API) comprising the account specific logic. In the event a non-internet channel calls the API (instead of communicating through the tracking code as further discussed in method 800 below), the non-internet channel can communicate with the API comprising the account specific logic. In many embodiments, the account specific logic can comprise instructions for updating personalized content that can be displayed on the webpage (or non-internet channel as discussed below in method 800). In some embodiments, the tracking code can be based at least in part on one or more conditions of a user (e.g., user 230 (FIG. 2)).

Figure 4:
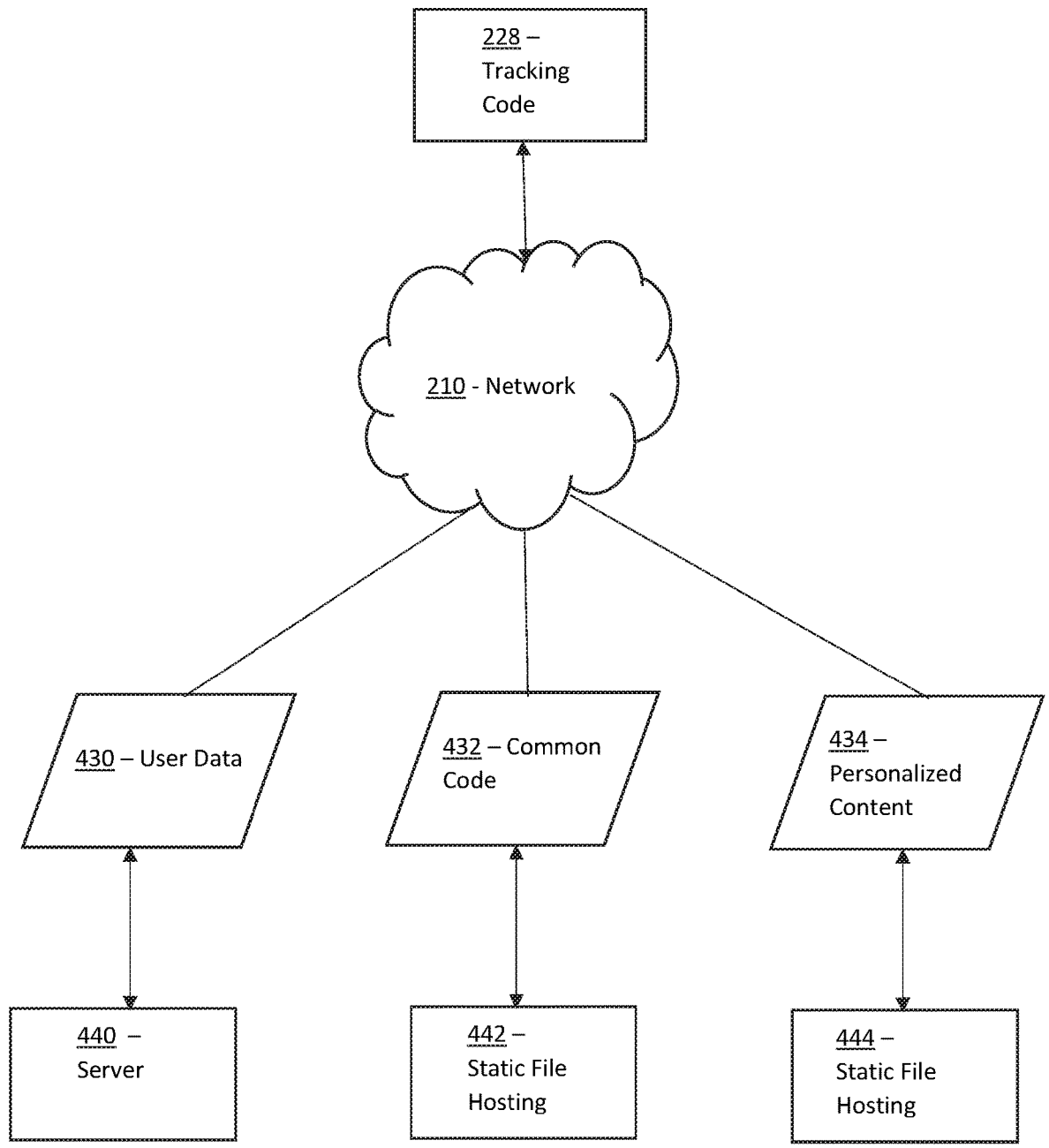
FIG. 4 illustrates a block diagram depicting how tracking code can be constructed and delivered to a browser of a user, according to an embodiment.

Turning briefly ahead in the drawings, FIG. 4 illustrates an example of how the tracking code can be constructed and delivered to a browser (e.g. browser 224 (FIG. 2)). In many embodiments, tracking code 228 can comprise logic or configuration for a given account (e.g., customer account that owns or runs the website visited by a user) and a user identity. In many embodiments, an account can have a unique tracking code file that can load specific logic for the account. In some embodiments, tracking code 228 can be a small amount of code (e.g., Javascript) installed in the header of the webpage. In some embodiments, such small amount of code can asynchronously load the tracking code 228. In a number of embodiments, static file hosting 444 can store personalized content 434, which can include master tracking code as well as account specific logic. The account specific logic can be loaded as a library and can be available to server-side code. In many embodiments, personalized content can comprise content that was not previously included as standard content on the webpage. Tracking code 228 can be dynamic and assembled via network 210, which can be a web worker, cloud worker, or traditional web service. In the event personalized content 434 does not exist, tracking code 228 can be served for it provided an account identification is a universally unique identification.

In many embodiments, tracking code 228 can be constructed by network 210 to include one or more of the following components, which can be in any order:

Common code 432—common code can be referred to as tracking code. Common code 432 is the main tracking code that contains global logic that applies to all accounts, such as initializing sessions, processing events, and sending data back to one or more servers. In some embodiments, common code 432 can be cached for a predetermined time period. Common code 432 can track on-site events (e.g., events that occur on the website) and, in some embodiments, can send the events to the API. In many embodiments, common code 432 can be cached for approximately 1 hour in each edge node (e.g., edge node 220 (FIG. 2)).

User Data 430—the data related to a user (e.g., user 230 (FIG. 2)). In some embodiments, in the event one or more cookies related a user (e.g., user 230 (FIG. 2)) are found, a user identity or client ID can be passed through to a tracking service (e.g., system 200 (FIG. 2)), which can look up existing data about that user identity, including segments (as discussed further below), geo-location data, and user conditions (such as user properties and visit count, as discussed further below). In some embodiments, the existing data that can be looked up can be only all user data within the requested customer account. If the cookie does not exist, a new user identity or client ID can be generated for the user. In many embodiments, the user identity can be used to do the following: (1) write the user data into the tracking code 228 and (2) set a cookie with an expiration date. In some embodiments, the cookie can be accessible across multiple accounts, allowing the user to have a consistent user identity or client ID, regardless of the account or website. User data 430 can be stored in a Server 440.

Personalized Content 434—is content, which can include text or images, that is pre-compiled by the administrative web service and is stored in static file hosting 444. In many embodiments, personalized content 434 can be cached for a predetermined time period. In some embodiments, personalized content 434 can be cached for approximately one hour in an edge node (e.g., edge node 220 (FIG. 2)).

Geo location (not shown)—geo location information can be derived from the IP address of a user (e.g., user 230

(FIG. 2)). If one or more specific cookies are present, the system (e.g., system 200 (FIG. 2)) can use a cookie value for geo location data (e.g., geo location from a past or previous user visit) instead of requesting it from the geo location web service. This can reduce load on the geo location webserver, as well as decrease latency for tracking code 228 requests. This geo location data can persist across all account sites and can be cached in the cookie for the current user browser session.

In many embodiments, tracking code 228 can be cached in the browser (e.g., browser 224 (FIG. 2) of a user (e.g., user 230 (FIG. 2)). The browser can be instructed to cache tracking code 228 for a predetermined period (e.g., 1 hour), meaning that geo data, personalized content, or user data 430 will not be reloaded within that predetermined period. In a number of embodiments, any changes to common code 432 or personalized content 434 will not propagate to the browser until the predetermined period expires.

In some embodiments, there can be country restrictions on the use of various features described herein.

Returning to FIG. 3, method 300 further can include an activity 304 of preventing at least a portion of standard content from displaying on a webpage of a website. In many embodiments, activity 304 of preventing at least the portion of standard content from displaying on the webpage of the website can comprise running a script or applying CSS styles to a webpage to prevent at least the portion of standard content from loading on the webpage of the website. In some embodiments, preventing at least the portion of standard content from displaying on the webpage of the website can comprise loading a script or CSS styles synchronously. In some embodiments, the script can synchronously stop or prevent the webpage of the website from loading or being displayed to the user. In some embodiments, method 300 can comprise stopping or preventing a portion or the entirety of the webpage from loading. In some embodiments, method 300 can comprise hiding a portion of the webpage that is or may be dynamically changed or personalized. As a non-limiting example, a portion of the webpage can be one specific region of the webpage, such as the title section, and in some embodiments, the title of a webpage can be hidden or prevented from being loaded, and the personalized title can be loaded with the webpage. The remainder of the website can be standard content. As described further below, the personalized content (e.g., personalized title) can be based on an experience. In a number of embodiments, method 300 further can include an activity 306 of receiving a request related to a webpage of a website from the tracking code (e.g., user 230 (FIG. 2)).

In many embodiments, method 300 also can include an activity 308 of determining a user identity of the user (e.g., user 230 (FIG. 2)). A user's identity can be tracked across domains and devices, and if multiple identities correspond to the same user, they can be merged or reference each other. In some embodiments, a user can be associated with one or more user identities. An identity can be used to allow tracking of users across devices, channels, and accounts, in order to serve the user personalization when the user is encountered. An identity can have a global scope as well as an account-specific scope. This can mean that an identity has some data stored about it globally throughout the system, as well as within each account for which the identity has been associated. In some embodiments, a given identity can have information specific to an account that is not shared with or used in connection with another account. In various embodiments, the identity can have information that is stored globally (i.e., independent of the account), as well as the information stored specific to each particular account.

Figure 5:
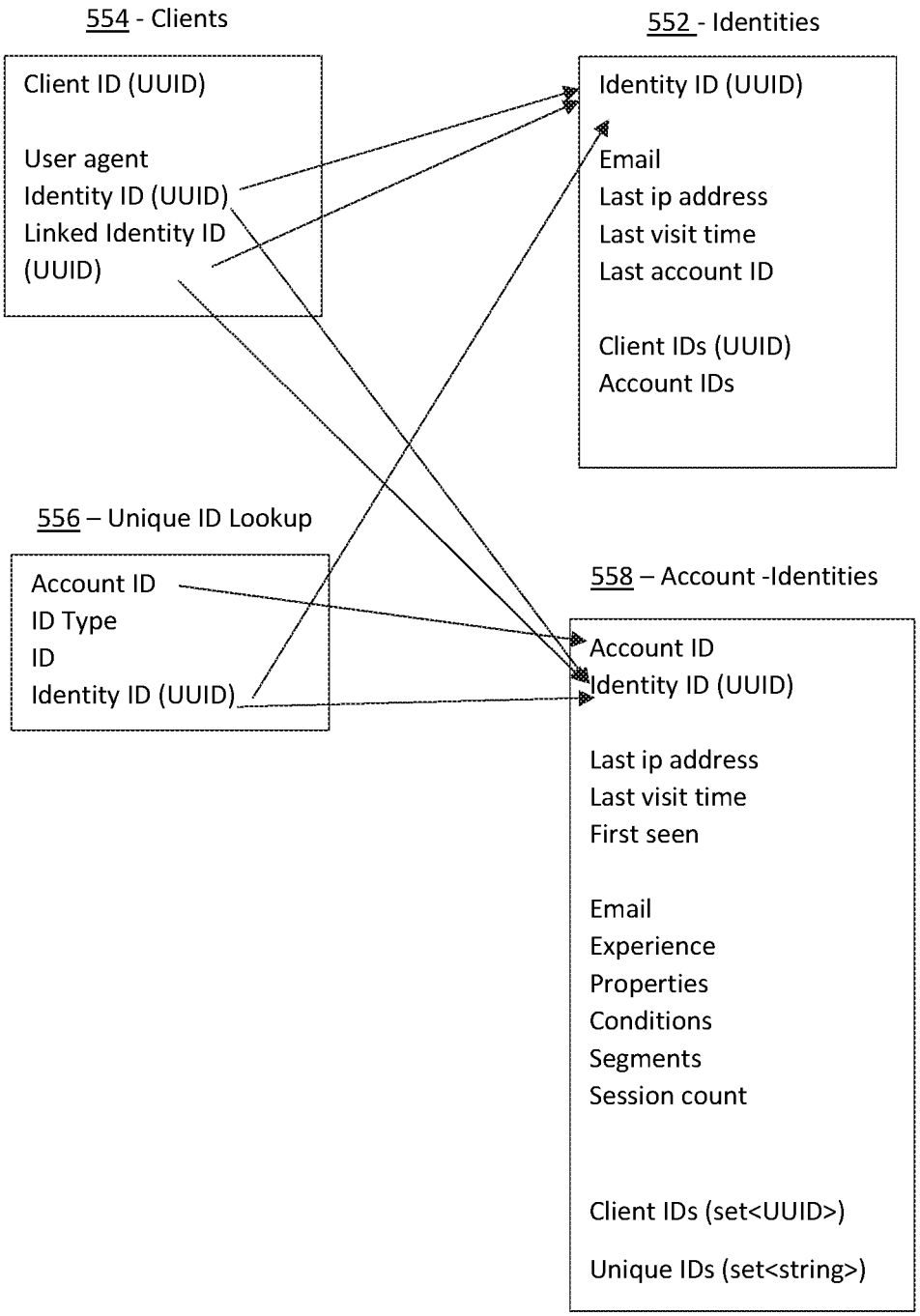
FIG. 5 illustrates a block diagram of the correspondence between clients and identities for a given user, in accordance with an embodiment.

The global identity information can include cross-site information, or "global" information, for a particular user. In some embodiments, the cross-site information can comprise user information based off any user activity over the internet or on an internet enabled device (e.g., a streaming application). Turning briefly to FIG. 5, FIG. 5 illustrates a simplified block diagram of the correspondence between clients and identities for a given user. A client can refer to the different modes by which a user can interact with a given channel, such as a website, or an application, such as via a smartphone app, smartphone web browser, desktop web browser, streaming TV device, etc., or other channel. In the event This information of identities 552 (e.g., user identities) can include:

One or more Email Addresses: this information can be a placeholder, for use in merging multiple identities 552 for the same user. In the event that that multiple accounts are found that reference an identity with the same email address, the global email value can be set and share that across multiple accounts.

Last IP Address Used: the last IP address of the identity 552, regardless of the account it was used on.

Last Visit Time: a timestamp of the last visit for the identity 552 to a website affiliated or associated with the tracking code, regardless of the account it was on.

Last Account ID: an ID of the account that the identity 552 was last seen on. This can correspond to the last website that the user visited having the tracking software.

User identity or Client IDs: a list of all client IDs that reference the identity 552. This list can include an ID for each device and/or mode of accessing account websites, such as smartphone app, smartphone web browser, desktop web browser, etc. A client 554 can be linked to a particular device or "client", e.g., a desktop browser vs mobile browser vs mobile app. Each client 554 can have a unique ID that references its user agent (to determine what type of device it is) and the identity it's linked to. This way, if identities are later merged, the client IDs on each client 554 do not have to be updated, but rather the pointer between the client ID and identity and be internally updated. The client ID also can prevent the actual identity API from being exposed to any client device/channel.

Account IDs: a list of all accounts associated with a particular identity 552. For each value in this list, there can be a record in the Account-Identities table 558.

In some embodiments, an identity 552 can also include account specific information. Account specific information is information that pertains to a given account. There can be multiple account-identities associated with a given global identity of a user. In many embodiments, an account identity can be defined by both the global identity ID and the account ID specific to the account identity. The account specific information can include:

Last IP Address: the last IP address of the user identity when it accessed the specific account's website.

Last Visit Time: a timestamp of the last time that the user identity visited the specific account's website.

First Seen: the first time this user identity was seen accessing the specific account's website.

Email: the email address of the user identity within the context of the account.

Experience: the ID of the current experience (as described below) for this user identity within the context of the specific account.

Attributes or Properties: a map of all properties (also referred to as attributes) for the user identity within the context of the specific account.

Conditions: a map of all user conditions and a count for each that have been satisfied by the user identity within the context of the specific account. These can be used for determining which segments the user identity is in for that specific account.

Segments: a list of active segments the user identity is in within the context of the specific account. In many embodiments, a segment is a grouping of identities by shared attributes (conditions and properties). Segments can be fluid and change often, so they can be reevaluated constantly as actions occur and identities are updated. An identity can "qualify" for a given segment based on its characteristics. And segments can change their qualifying requirements over time as actions occur Session Count: a number of times the user identity has visited one of the specific account's websites or other channels.

Client IDs: a list of all Client IDs that reference the user identity.

Unique IDs: a map of all unique IDs that reference this user identity within an account. Each unique ID can be an arbitrary metric, and can include two parts, (1) an ID type (e.g., "third party account ID"), and (2) the value of the ID (e.g., "5003000000D8cul"). Example Unique IDs can include email, phone number, a third party account ID, and more.

In some embodiments, an identity 552 can be looked up based on a particular Unique ID in a unique ID lookup table 556. A given account can have the ability to link third party identifiers to specific identities. Example third party identifies can include an email address, phone number, or CRM contact ID. The account can look up a user identity using the third party ID by providing (1) the Account ID (identities can have different references across accounts), (2) the ID Type: A label that identifies the source/type of this identifier (e.g., "email", "salesforce id", "phone", "mailchimp id,") and (3) the ID: the actual ID within the context of the type. As a non-limiting, if ID Type is "email", this would be the email address and if ID Type is "salesforce ID", it could be "5003000000D8cul." In the event the above three fields match a record for a user identity, link to the global Identity associated with that user can be created.

In some embodiments, it can be beneficial to update the identity or identities associated with a given user. Updates to the user identity can be done via website activity, or via an identity API. When the user interacts with a given website, the identity associated with the user can be updated automatically via tracking in the user's browser. When a request is made to a tracking service (which can include a back-end server or database (e.g., database 440 (FIG. 4)) on which global identity information, account identity information, and other information is stored), the user's identity ID or client ID for that device or browser can be provided. Based at least in part on the client ID, the appropriate identity can be looked up and either returned (on start of a browser or view session) or updated based on user activity. In some embodiments, an identity API can be used to update the identity information. Third party clients can retrieve data and/or update a particular identity via the identity API. In order to request or update information, the identity API can require the account ID, as well as an identity, user ID or other unique ID (of the user). If a GET request is made, the identity can be returned within the context of the account. In many embodiments, the global identity object cannot be returned via the identity API. If a PUT request is made, the specified identity within the context of the account can be updated as instructed.

Figure 6:
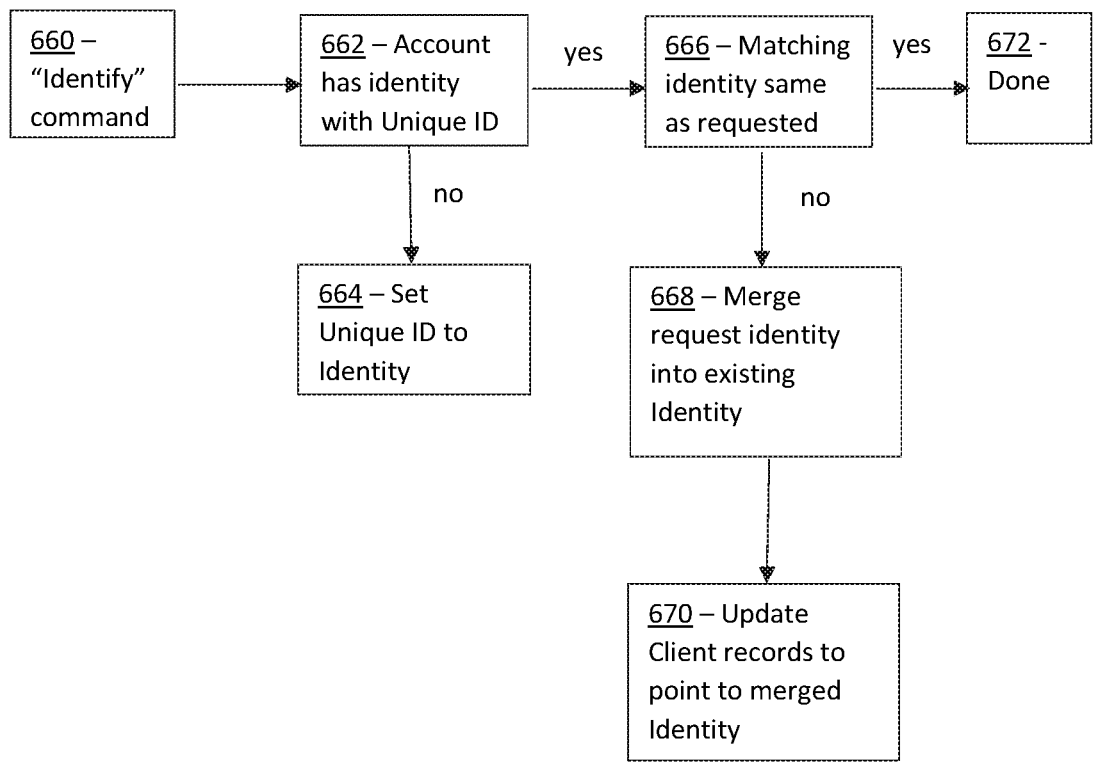
FIG. 6 illustrates a flowchart for a method of merging identities, according to an embodiment.

In some embodiments, it can be beneficial to merge two or more identities together. This is particularly useful where multiple identities correspond to the same user. FIG. 6 illustrates a method 600 for merging two or more identities. When a user visits a website of a particular account or when there is a request directly to the identity API, the account can issue an identify command 660 to request to identify the identity of the user or to lookup the identity. Method 600 determines first if an account has an identity with a unique id (activity 662) and if yes, determines if another identity is already referenced with that identifier within the same account at activity 666. In the event activity 662 determines that the identity does not have that unique ID within the context of the account, method 600 sets a unique ID to the identity at activity 664. In the event activity 666 determines that the identity matches the same identifier, then method 600 is complete and no merge is performed. In the event there is already another identity referenced, the identities will be merged into one at activity 668. The client IDs will stay the same, but will be updated to point to the new, consolidated Identity at activity 670. For example, one scenario can include:

(1) A user browses a brand's (i.e., account's) website on their phone. "Client A" is created (based on the use of the phone) and points to "Identity A".

(2) The user makes a purchase on their desktop of a product of the brand. The website makes an identify call using the email address of the user as the identifier. "Client B" is created (based on the desktop) and points to "Identity B." The global identity info includes that email address.

(3) the brand sends a follow up email to the user, embedding an identifier such as their Identity ID, email, etc. ("Identity B") into links in the email.

(4) The user clicks a link on their phone, indicating that client A (the phone) and "Identity A" share the same unique identifier (the email address) as "Identity B" and should be linked to "Identity B".

(5) "Identity A" is merged into "Identity B"; "Client A" (the phone) is updated to point to "Identity B"; and "Identity A" is then deleted.

As a result, the user can be tracked as a singular identity across two devices (the phone and the desktop). Any changes to personalization due to future behavior will be persistent across both devices. In a similar manner, any additional devices or "clients" that are used to access this particular account can be merged, so that a single identity corresponds to multiple devices (phone app, phone web browser, desktop, tablet browser, etc.).

In some embodiments, the one or more identities of a user can be merged or cross-referenced by relating or loosely connecting the one or more client IDs of the user to two or more user identities without creating a single identity. In this and other embodiments, any update or change to a user identity in one account is also done to the related user identity in a different account.

In some embodiments, method 300 also can include an activity 310 of determining one or more user conditions of a user based at least in part on the user activity (e.g., user 230 (FIG. 2). The one or more user conditions can be determined from user data (e.g., user data 430 (FIG. 4)). User conditions can be anything that can be evaluated for a given user identity, such as a web session metric, a purchase (either online or offline), geography or location, a predefined event, and more. In some embodiments, a condition can be something that can be met by the user, such as an attribute (e.g., age or gender) or an item that is tracked, such as number of visits (or sessions) to a non-website channel. In many embodiments, the one or more user conditions can comprise at least one of a geolocation, local weather conditions (in some embodiments based on the location of the user), data from a third party data source (in some embodiments the third party data source can be the customer's data source or an unrelated data source), an event, or a count of user actions, such as a number of webpage visits, views, or clicks (such as time of click, location on page of the element clicked, and what element was clicked). As a non-limiting example, a user condition can include whether the user has made a purchase on a particular website. The user condition can be a number that increments. In this example, the user condition can be met each time an item is purchased. The user condition can start at 0, and each time something is purchased, the condition can increment by 1. In some embodiments, user information can be obtained from third party sources, from the user via one or more other device interactions, from the owner of the website (e.g., an account holder), and/or from various other sources.

The user conditions and related information can be stored in a data store. The user conditions and related information can be used in the future, such as for creating machine learning models. It can also be stored in databases (e.g., database 440 (FIG. 4)), which can assist in the ability to look up user identity data (user conditions or related information). In the event any update to a user identity occurs externally, the user conditions and related information can be updated to be loaded and evaluated the next time that user identity starts a new session on a website or other channel. In some embodiments, a method can determine an update to the one or more user conditions of the user. In some embodiments, determining the update to the one or more user conditions of the user can comprise tracking the user through a plurality of websites, wherein each website of the plurality of websites comprises a unique tracking code, compiling a global user identity for the user, and dynamically updating the one or more user segments based at least in part on the update to the one or more user conditions of the user. In some embodiments, the user can be tracked through a different platform, such as a streaming application or an internet enabled device (e.g., a smartphone app, a smart television, or other channel).

In many embodiments, method 300 also can comprise an activity 312 of determining one or more segments based at least in part on one or more user conditions of the user and the identity of the user. A user identity can be associated with one or more segments which, along with other information, can be used to personalize the webpage or website experience. In some embodiments, activity 312 of determining the segment further can comprise comparing the one or more user conditions to a condition map. In many embodiments, activity 312 of determining the segment further can comprise evaluating the segment in constant time by using pre-compiled logic to determine a pre-define an output. In many embodiments, the output can comprise personalized content. In some embodiments, evaluating the segment in constant time can comprise pre-compiling logic (which in some embodiments can be pre-compiled by a user or customer action within a user or customer account) into a file or stored in a database and loaded as a library that can be used in real-time by pre building lines of code and pre-defining an output. In some embodiments, the pre-defined output, which can be stored in a database and loaded as a library, can be attached in a memory to a running server instance and process. In the event of an update, the logic can be re-compiled, and the server instance and process can be updated. The evaluation of the segment can be run through the pre-built algorithm, which runs in constant time without regard to the size of the input (e.g., the user conditions). As a non-limiting example of constant time, logic can be pre-compiled into a file (e.g., a JAVA file) that can be used in real time. The pre-compiled logic can be a line of code that allows for a pre-defined output and the number of operations performed does not depend on the size of the input (e.g., the code will run in the same or constant time). In some embodiments, a count of a user condition can be the input and the segment can be evaluated in constant time using the pre-compiled logic (e.g., when a count of a particular user condition is between a set range, a particular segment is outputted). In some embodiments, the constant time file can be dynamically built based at least in part on segments and user conditions. In some embodiments, the constant time file can be compiled and made available in a library, for example, in static file hosting 442 (FIG. 4).

In some embodiments, a user can qualify for various segments based on the tracked user information. In a number of embodiments, a user can be put into or qualified for an "experience" based at least in part on the segments or the user's combination of segments. In some embodiments, a user identity can correspond to a particular experience or experiences based on the segments for which it qualifies. The experience can dictate which content and styles are made dynamic. As a non-limiting example, a dynamic region can be created out of the home page hero image. This region will have different variations, each tied to a specific experience. An identity that qualifies for a particular experience dictates what the dynamic region of the website will display (e.g., which version of the hero image will be used). Experiences can be active or inactive. Based on the configuration of the experience, the appropriate content can be updated on the given webpage the user is viewing, including changing text, changing images, altering attributes of webpage (DOM) elements, executing other JavaScript code, and inserting CSS style rules.

Method 300 further can comprise an activity 314 of determining an experience (as described further below) based at least in part on the one or more segments of the user and the user identity of the user.

In many embodiments, method 300 further can comprise an activity 316 of facilitating display of the personalized content on the webpage of the website in place of the at least the portion of the standard content based at least in part on the tracking code (e.g., tracking code 228 (FIG. 2) and the experience. In some embodiments, the standard content is synchronously hidden or prevented from loading onto the website (or channel). In some embodiments, activity 316 can comprise asynchronously facilitating display of the personalized content. In many embodiments, the tracking code can be used to change the content displayed to a user. This can include changing the location, size, or other characteristics of objects as well as the actual content displayed (text, videos, etc.). The tracking code can apply any styles related to the active experience for the user. In some embodiments, the tracking code can create a new stylesheet in code and apply the rules to it, immediately taking effect in real-time on the webpage. Based at least in part on the active experience, the tracking code can change elements on the current webpage that match the conditions defined, which optionally include CSS selector and matching a regular expression to the current webpage. In most embodiments, any elements on the webpage that match the conditions are updated. If text or HTML is to be changed, the tracking code can modify or replace the innerHTML property for the element or can replace it with a new HTML element. If an image is to be applied, it can be added via the src attribute if an <img> element, or as a background image otherwise. If the tracking code is to update attributes for an element, it can directly update those attributes as defined in the configuration.

In various embodiments, the tracking code can enable the account holder, webpage, or website to modify what is displayed based on one or more characteristics or user conditions of the user viewing the webpage. This can include modifying text, images, layouts, styles, orientations, order of display of various elements or features, adding or removing functionality (e.g., links, videos, etc.) and many other visual and nonvisual modifications to the website. In many embodiments, these modifications can be done using a visual editor, which can allow account holders to modify the dynamic content that gets shown for each active experience. The account holder can use the visual editor to develop different versions of their website that can be displayed to users based on the criteria described above. If a valid authentication token is provided by the account holder, a browser extension can load the code for the visual editor.

In the event an account holder wishes to use the visual editor, a request can be made to management service to create a signed JSON web token (JWT). In some embodiments, only the management service knows the key used to sign the tokens, so its signature cannot be imitated. The payload of the token is the account that's authorized to be edited. This will only occur if the signed-in account holder has access to the specified account. In many embodiments, the token can be signed with an algorithm, can expire in a configurable amount of time, can be issued under a specified domain, or the subject of which can be the account holder's ID (from the authentication provider). When making configuration changes, the visual editor can use the main API, but can send its authentication token through an editor token header. This authentication token can be parsed server-side, validated with the same secret key and, if the issuer matches, the request can be performed within the context of the account and user signed into the token.

In some embodiments, a method can be used in an edge node (e.g., edge node 200 (FIG. 2)) to create tracking code that is served to a user. A network similar to network 210 (FIG. 2) can be used in this method. In some embodiments, the network can be a cloud worker. The method can include a script initialization in a browser (e.g., browser 224 (FIG. 2)) and can assume user data or information (e.g., user data 430 (FIG. 4)) which can include user conditions and segments, as discussed above.

In many embodiments, the script can fire off or send a pageview request internally automatically, signifying a pageview has occurred. In the same or other embodiments, the tracking code can bind to the DOM onload event so that, when the page is made available, it can change the appropriate content on the current page.

In some embodiments, an event is an abstract, arbitrary action that a user fulfills, such as a pageview, transaction, watching a video, etc. A pageview is simply a special type of event. When this method is invoked, it can ensure that there is a proper page path (or uses the current page if not provided), and creates an object out of all query parameters.

A transaction is a special type of event that validates the transaction details passed to it, reformats the data object, and invokes an event action, passing the special event name with all relevant transaction data. When an event occurs, the below tasks can be performed when the tracking code is requested or when a tracking request is made. In some embodiments, the tasks can be performed in constant time, which allow for the execution of tasks in the same amount of execution cycles, regardless of the size of the new or previous input (e.g., user conditions).

1. Condition Matching—an event is matched to existing conditions defined within the account and, if the event matches one, that condition count is incremented. If it's the first time that condition has been encountered, the count is set to 1.
2. Segment Qualification—using the updated condition counts, the method then evaluates each possible segment. In some embodiments, this evaluation is done on the server-side and not by the tracking code. If all the conditions (and counts) match for a given segment, the visitor is put into that segment. Some conditions do not require a count, but rather evaluate the current status of the user or visit. For example, geo location as a condition is not dependent on how many times the user was in that geo region, but rather whether they're in it at the time of evaluation.
3. Experience Selection—based on the combination of segments, the tracking code determines which experience the user qualifies for. There's a priority order, so if a user qualifies for multiple experiences, they will only be put into the higher priority one. If no experiences are a match, no experience will be assigned (so that nothing is changed on the page).
4. Data storage—all data evaluated as a result of an event (segments, conditions, etc.) is stored in a database for later retrieval.

Figure 7:
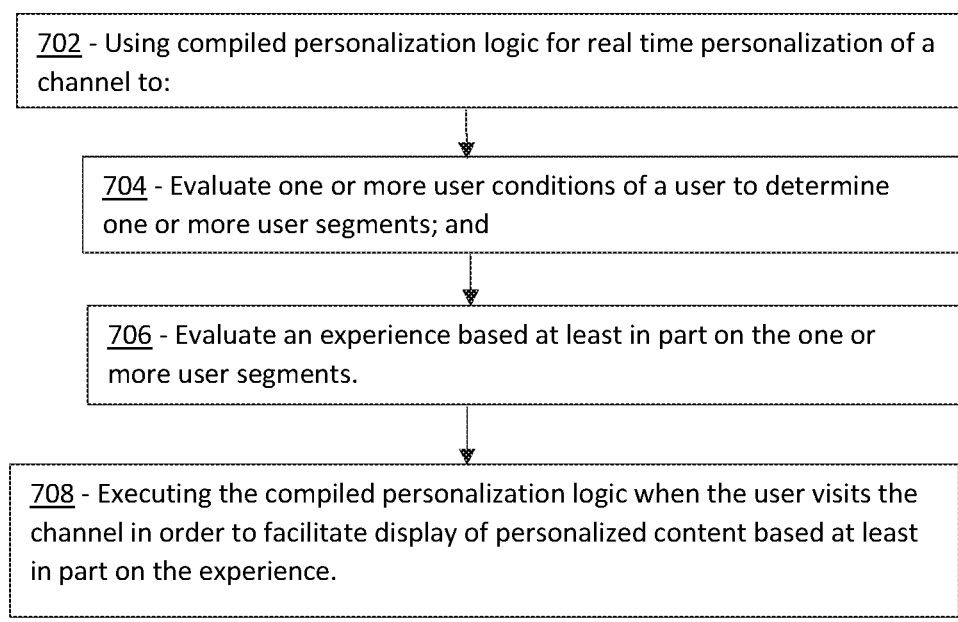
FIG. 7 illustrates a flowchart for a method for personalizing digital displayed media, in accordance with another embodiment.

Moving ahead in the figures, FIG. 7 illustrates a flowchart of a method 700 for personalization of digital media. In some embodiments, method 700 can be similar to method 300 (FIG. 3). Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still other embodiments, one or more of the activities of method 700 can be combined or skipped. In many embodiments, system 200 (FIG. 2) can be suitable to perform method 700 and/or one or more of the activities of method 700. In these or other embodiments, one or more of the activities of method 700 can be implemented as one or more computer instructions configured to run at one or more processing modules and configured to be stored at one or more non-transitory memory storage modules. Such non-transitory memory storage modules can be part of a computer system such as system 200 (FIG. 2), including edge node 220 or network 210 (FIG. 2). The processing module(s) can be similar or identical to the processing module(s) described above with respect to computer system 100 (FIG. 1).

In many embodiments, method 700 can comprise an activity 702 of using compiled personalization logic for real time personalization of a channel. In many embodiments, activity 702 can comprise using compiled personalization logic for real time personalization of a channel to evaluate one or more user conditions of a user to determine one or more user segments (activity 704) and evaluate an experience based at least in part on the one or more user segments (activity 706). In some embodiments, method 700 further can comprise an activity 708 of executing the compiled personalization logic when the user visits the channel in order to facilitate display of personalized content based at least in part on the experience.

In various embodiments, the personalization logic can synchronously prevent loading of a portion of standard content on the channel and asynchronously insert the personalized content onto the channel.

In some embodiments, activity 704 can comprise determining the one or more user segments in constant time. In the same or other embodiments, method 700 further can comprise determining an update to the one or more user conditions of the user and dynamically updating the one or more user segments based at least in part on the update to the one or more user conditions of the user. In some embodiments, determining the update to the one or more user conditions of the user can comprise tracking the user through a different channel (e.g., collecting data on the user when the user is watching a television show and using the data or user conditions on another channel (e.g., an application), such as introducing an advertisement for the television show) and compiling a global user identity for the user. In some embodiments, the identity API can be called directly in order to track a user's activity (including events and other user conditions) and/or receive or display personalized content.

In some embodiments, method 700 can comprise activities of running personalization logic for a user as a result of an event or change in one or more user conditions (in some embodiments when a user visits a channel or when requested by a third party service). In many embodiments, method 700 also can comprise an activity of receiving or sending the experience or personalized content for the user (in some embodiments when a user visits a channel or when requested by a third party service).

Although systems and methods for personalization of digital displayed media has been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the activities of FIGS. 3 and 5-7 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for personalization of digital displayed media comprising:
    one or more processing modules; and
    one or more non-transitory storage modules storing computing instructions configured to run on the one or more processing modules and perform acts of:
        inserting a tracking code in a webpage of a web site, wherein the tracking code comprises common code, a result of account specific logic and configuration, and a result of user specific configuration; and tracks user activity on the webpage of the web site, and the common code applies to two or more accounts and the result of account specific logic comprises instructions for updating content for an account of the two or more accounts and the result of user specific configuration comprises instructions for updating content for a user of two or more users;
        temporarily preventing at least a portion of standard content from displaying on the webpage of the web site by applying CSS styles to the webpage of the web site to temporarily prevent display of at least the portion of standard content;
        receiving a request related to the webpage of the web site from the tracking code;
        determining a user identity of the user of the two or more users using an identity API;
        determining one or more user conditions of the user of the two or more users based at least in part on the user activity;
        determining one or more user segments based at least in part on the one or more user conditions of the user of the two or more users and the user identity of the user of the two or more users, wherein a user segment is a grouping of user identities by shared user conditions and the one or more user segments comprise a subset of the two or more users based upon the one or more user conditions;
        determining an experience for the user of the two or more users based at least in part on the one or more user segments of the user of the two or more users and the user identity of the user of the two or more users;
        using the experience to provide a consistent contextual content to the user of the two or more users across two or more channels by changing the content of a predefined region of at least one of the two or more channels based at least in part on the experience, wherein each channel of the two or more channels comprises either a web site channel or a non-web site channel; and
        changing the standard content of a predefined region to new content for the user of the two or more users on the predefined region of at least one channel of the two or more channels, wherein at least one of the two or more channels comprises the web site channel.

2. The system of claim 1, wherein:
    determining the one or more user segments further comprises evaluating the one or more user conditions via a pre-compiled wherein:

the pre-compiled logic pre-defines an output and
the pre-compiled logic is executed by a web service and is stored in a staticly-compiled library in a database or a file.

3. The system of claim 2, wherein:
pre-compiling the account specific logic to pre-define the output is based at least in part on an action of the user of the two or more users;
the account specific logic is loaded in a library on a webserver and used by the system in real-time; and
a capped number of operations performed by the account specific logic is independent from the size of an input, wherein the input is at least one of:
data provided with an event;
an attribute of the user of two or more users;
one or more user conditions;
one or more user segments;
one or more existing users; or
one or more prior sessions recorded for the user.

4. The system of claim 2, wherein:
the output comprises the experience for the user of the two or more users;
the pre-compiled logic is stored in a database or file and is loaded as a library;
the pre-compiled logic comprises an algorithm that runs no more than a capped number of computational commands without regard to the size of an input; and
the input is based on the one or more events of the user of the two or more users.

5. The system of claim 1, wherein:
the one or more user conditions comprise at least one of:
a geolocation;
local weather conditions;
data from a data source external from the system;
an event;
a user attribute;
a number of webpage visits to the webpage of the website;
a number of sessions/visits to other non-website channels;
a number of webpage views; or
a number of webpage clicks.

6. The system of claim 1, wherein:
the tracking code is constructed at least in part on the experience for the user of the two or more users and the tracking code is different for each experience.

7. The system of claim 1, wherein the one or more non-transitory storage modules storing the computing instructions are configured to run on the one or more processing modules and further perform the acts of:
determining an update to the one or more user conditions of the user of the two or more users by:
tracking the user of the two or more users through a plurality of websites, wherein each website of the plurality of websites comprises a unique tracking code; and
compiling a global user identity for the user of the two or more users by tracking the user of the two or more users through two or more channels within the system; and
dynamically updating the one or more user segments based at least in part on the update to the one or more user conditions of the user of the two or more users.

8. The system of claim 1, wherein the one or more non-transitory storage modules storing the computing instructions are configured to run on the one or more processing modules and further perform the acts of:

updating the one or more user conditions based on an action of the user of the two or more users;
determining a new one or more user segments based at least in part on the updated one or more user conditions;
determining an updated experience for the user of the two or more users based at least in part on the one or more user segments; and
using the new experience to provide an updated consistent contextual content to the user of the two or more users across at least one channel of the two or more channels.

9. The system of claim 8, wherein:
determining the new one or more user segments based at least in part of the updated one or more user conditions comprises removing the user of the two or more users from a user segment.

10. The system of claim 1, wherein:
no more than one channel of the two or more channels comprises a website.

11. The system of claim 1, wherein the one or more non-transitory storage modules storing the computing instructions are configured to run on the one or more processing modules and further perform the acts of:
changing the standard content of the predefined region to the new content for the user of the two or more users on the predefined region of each channel of the two or more channels when the each channel of the two or more channels encounters the user of the two or more users.

12. A method for personalization of digital media comprising:
inserting a tracking code in a webpage of a website, wherein the tracking code comprises common code, a result of account specific logic and configuration, and a result of user specific configuration; and tracks user activity on the webpage of the website, and the common code applies to two or more accounts and the result of account specific logic comprises instructions for updating content for an account of the two or more accounts and the result of user specific configuration comprises instructions for updating content for a user of two or more users;
temporarily preventing at least a portion of standard content from displaying on the webpage of the website by applying CSS styles to the webpage of the website to temporarily prevent display of at least the portion of standard content;
receiving a request related to the webpage of the website from the tracking code;
determining a user identity of the user of the two or more users using an identity API;
determining one or more user conditions of the user of the two or more users based at least in part on the user activity;
determining one or more user segments based at least in part on the one or more user conditions of the user of the two or more users and the user identity of the user of the two or more users, wherein a user segment is a grouping of user identities by shared user conditions and the one or more user segments comprise a subset of the two or more users based upon the one or more user conditions;
determining an experience for the user of the two or more users based at least in part on the one or more user segments of the user of the two or more users and the user identity of the user of the two or more users;
using the experience to provide a consistent contextual content to the user of the two or more users across two or more channels by changing the content of a predefined region of at least one of the two or more channels based at least in part on the experience, wherein each channel of the two or more channels comprises either a website channel or a non-web site channel; and changing the standard content of a predefined region to new content for the user of the two or more users on the predefined region of at least one channel of the two or more channels, wherein at least one of the two or more channels comprises the website channel.

13. The method of claim 12, wherein:

determining the one or more user segments further comprises evaluating the one or more user conditions via a pre-compiled logic wherein: the pre-compiled logic pre-defines an output and the pre-compiled logic is executed by a web service and is stored in a staticly-compiled library in a database or a file.

14. The method of claim 12, wherein:

the one or more user conditions comprise at least one of:
a geolocation;
local weather conditions;
data from data source external from the system;
an event;
a user attribute a number of webpage visits to the webpage of the website;
a number of visits to other non-website channels;
a number of webpage views; or
a number of webpage clicks.

15. The method of claim 12, wherein:

the tracking code is constructed at least in part on the experience for the user of the two or more users and the tracking code is different for each experience.

16. The method of claim 12, further comprising:

determining an update to the one or more user conditions of the user of the two or more users by:
tracking the user of the two or more users through a plurality of websites, wherein each website of the plurality of websites comprises a unique tracking code; and
compiling a global user identity for the user of the two or more users by tracking the user of the two or more users through two or more channels within the system; and
dynamically updating the one or more user segments based at least in part on the update to the one or more user conditions of the user of the two or more users.

\* \* \* \* \*